W. L. MAJORS.
HEATER FOR WATER COOLING APPARATUS OF MOTOR VEHICLES AND THE LIKE.
APPLICATION FILED JAN. 3, 1913.

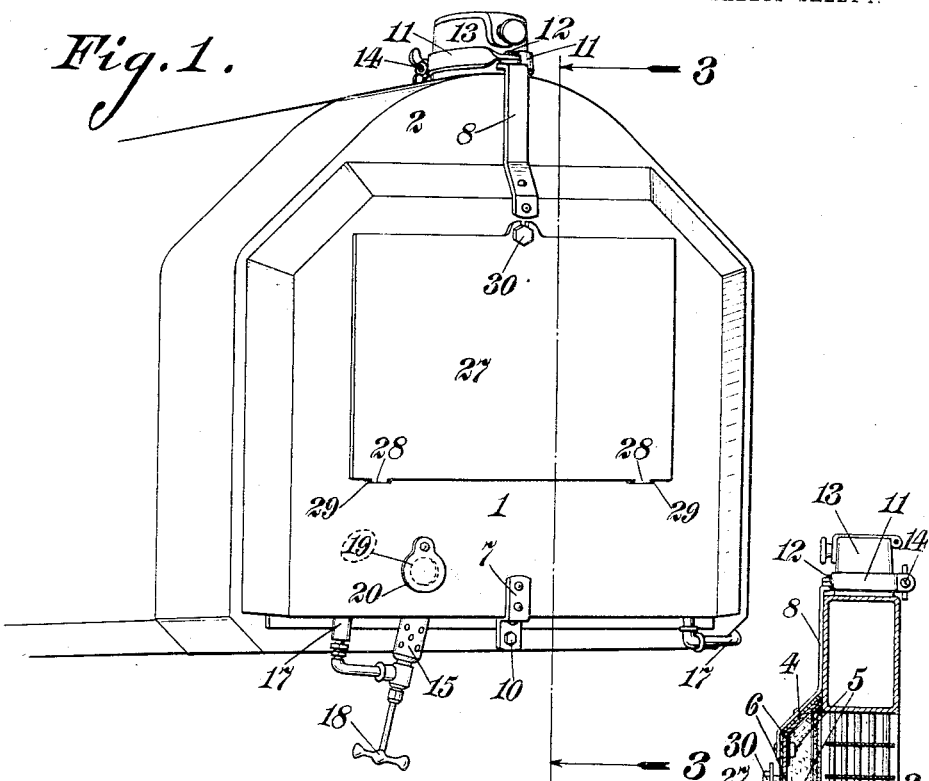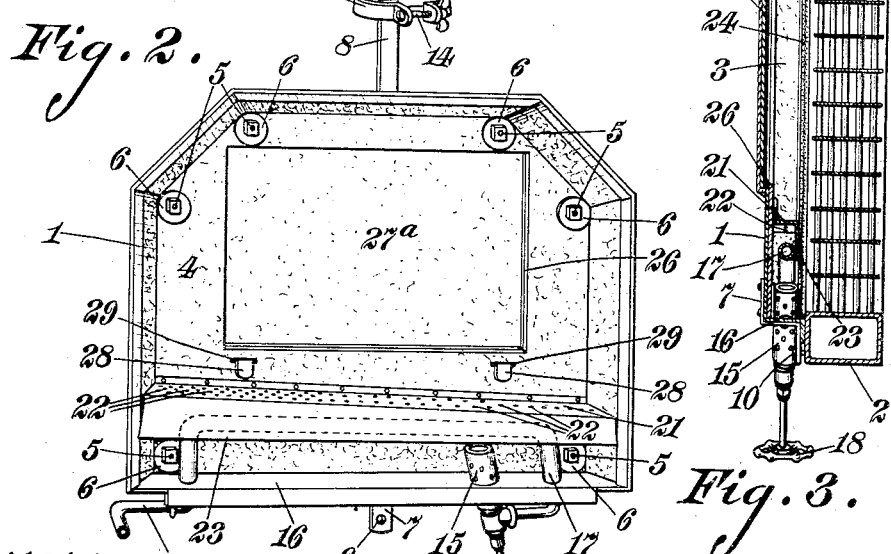

1,121,266. Patented Dec. 15, 1914.
4 SHEETS—SHEET 2.

Witnesses:
Harry H. Reiss.
George G. Anderson.

Inventor:
Walter L. Majors,
By Hugh K. Wagner,
His Attorney.

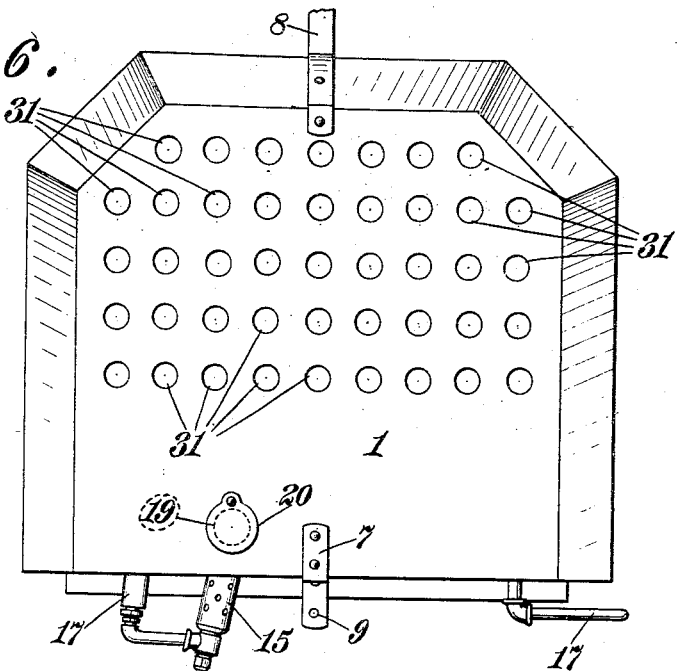
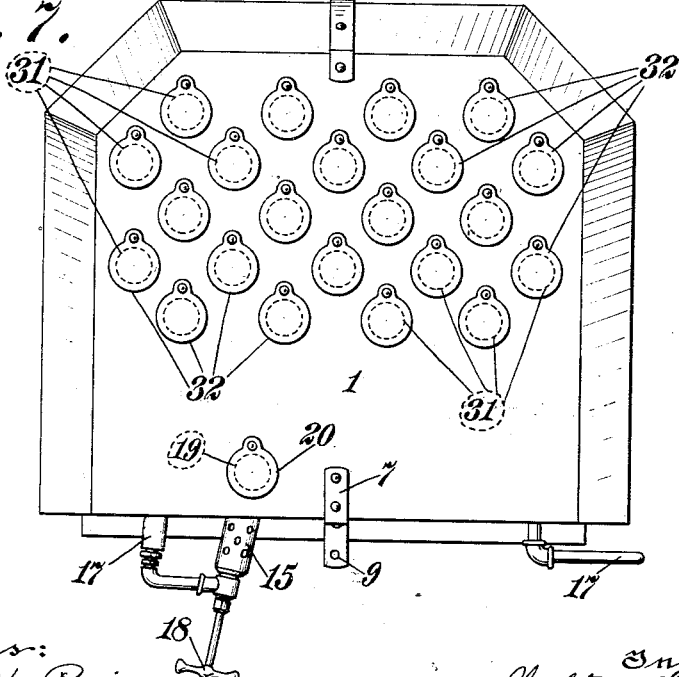

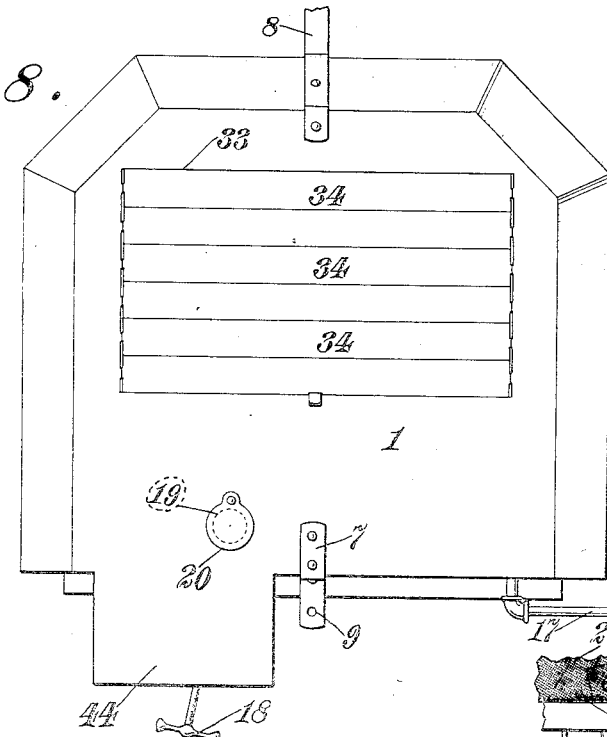
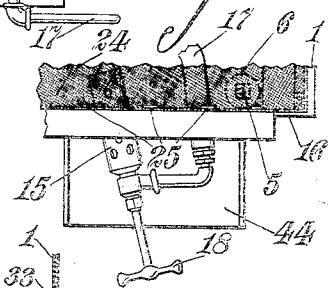
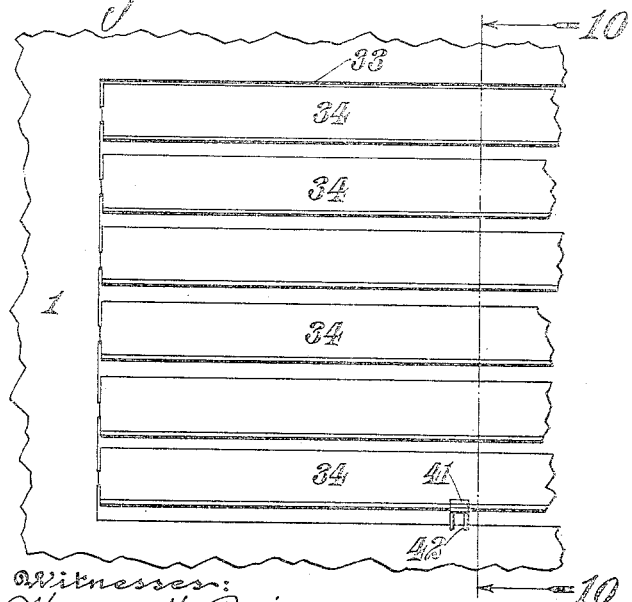
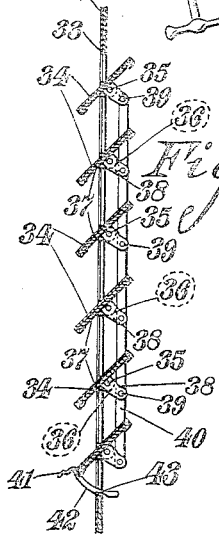

UNITED STATES PATENT OFFICE.

WALTER L. MAJORS, OF ST. LOUIS, MISSOURI, ASSIGNOR OF ONE-HALF TO ANNIE M. TURNBO, OF ST. LOUIS, MISSOURI.

HEATER FOR WATER-COOLING APPARATUS OF MOTOR-VEHICLES AND THE LIKE.

1,121,266.   Specification of Letters Patent.   Patented Dec. 15, 1914.

Application filed January 3, 1913. Serial No. 739,932.

*To all whom it may concern:*

Be it known that I, WALTER L. MAJORS, a citizen of the United States, residing at the city of St. Louis, State of Missouri, have invented certain new and useful Improvements in Heaters for Water-Cooling Apparatus of Motor-Vehicles and the like, of which the following is a specification.

Ordinarily, when an automobile or other motor vehicle is allowed to stand idle in cold weather, the water in the cooling system becomes so cold that it cools the cylinders of the engine to such extent that it is difficult to start the engine, and sometimes the water in the cooling system freezes and causes the cylinders, tubes in the radiators, pipes, and other parts to burst.

It is the object of the present invention to obviate these objectionable features by providing an apparatus which, when an automobile or other motor vehicle is allowed to stand idle in cold weather, will heat the water in the cooling system and thereby prevent same from freezing and, also, facilitate the starting of the engine.

Further, the present invention consists of the novel feature of construction and arrangement of parts hereinafter more fully described and pointed out in the claims.

Figure 4:
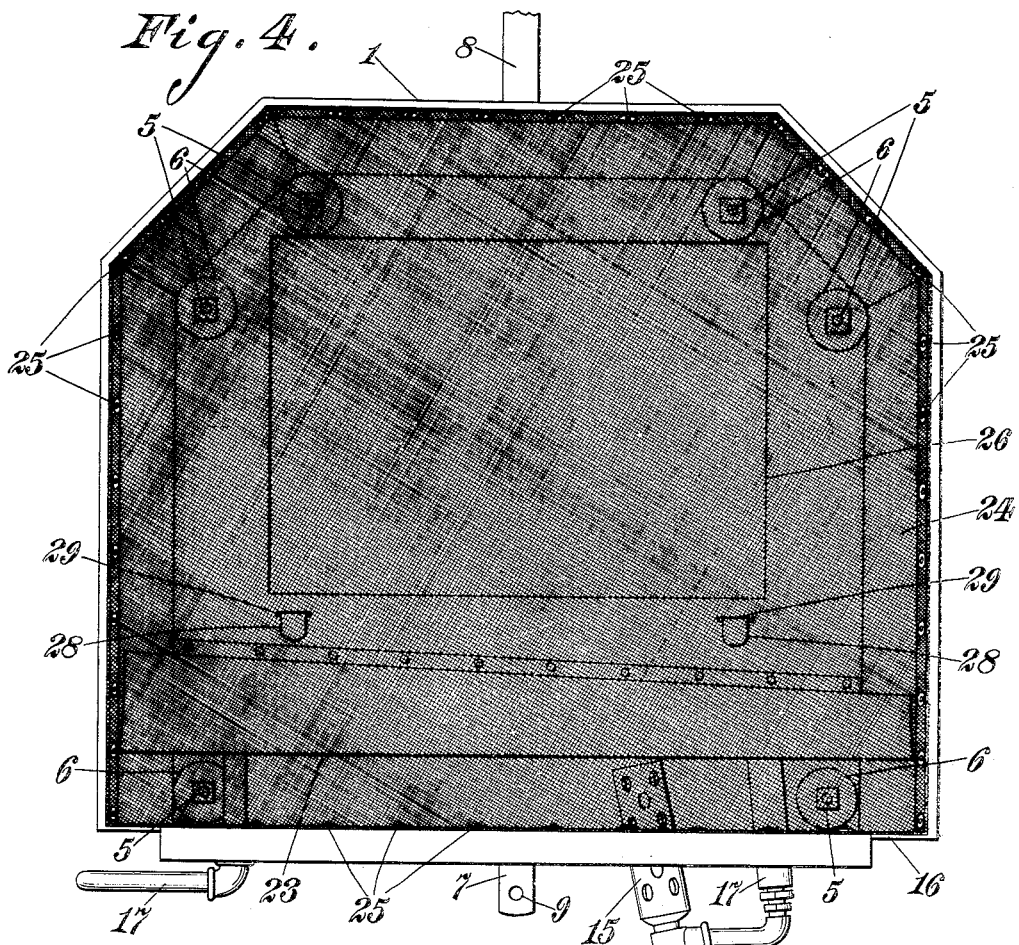
Figure 5:
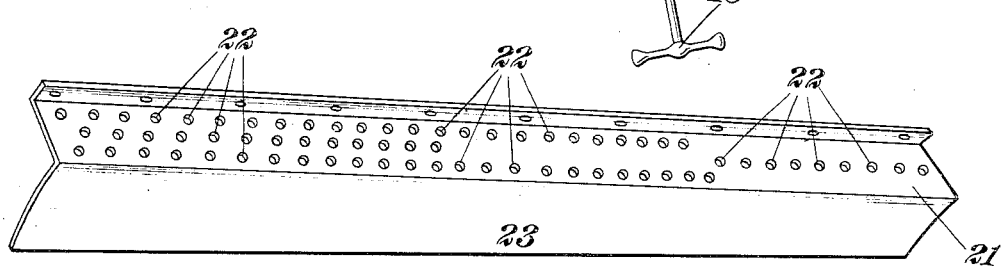

In the accompanying drawings forming part of this specification, in which like numbers of reference denote like parts wherever they occur, Figure 1 is a perspective view of the radiator of an automobile equipped with an apparatus, which embodies the present invention; Fig. 2 is a perspective view of the rear side of the apparatus with the screen removed; Fig. 3 is a sectional view on the line 3—3, Fig. 1; Fig. 4 is a rear elevation of the apparatus with the screen in place; Fig. 5 is a perspective view of the heat distributer; Figs. 6, 7, and 8 are front elevations, showing alternate forms of ventilating means for the apparatus; Fig. 9 is a fragmentary front elevation, on an enlarged scale, of the ventilating means depicted in Fig. 8; Fig. 10 is a sectional view on the line 10—10, Fig. 9; and Fig. 11 is a rear elevation of part of the shield, showing a protector for the blow-torch burner.

The apparatus consists of a shield 1, which is preferably formed of metal and is given a shape to conform to the configuration of the ventilating opening in the radiator 2, so as entirely to cover said opening as depicted in Fig. 1. The top of the shield is preferably arranged to slope downward from the radiator, and the sides converge from the radiator so that only the edges of the shield touch or nearly touch the radiator and a space 3 is left between the face of the shield and the front of the radiator, which space communicates with the ventilating opening of the radiator. The rear side of the shield 1 is provided with a lining 4 of asbestos or like material. The edges of the shield 1 may be bent over the edges of the lining 4 adjacent thereto and bolts 5 and washers 6 may also be used for holding the lining in place, or any other desired means may be used for the same purpose. In order to fasten the shield 1 to the radiator 2, the former has a plate 7 or the like riveted or otherwise secured at or adjacent to the bottom thereof and a bar 8 or the like riveted or otherwise secured at or adjacent to the top of same, said plate 7 having an opening 9 to receive a bolt 10 or other suitable means for attaching same to the radiator, and the bar 8 having a pair of arms 11 pivotally attached at 12 thereto, which arms are preferably semicircular and adapted to embrace the neck 13 of the radiator 2 and have their free ends connected by a bolt or clamp-screw 14 or other suitable means for clamping same around the neck 13. By this arrangement, the shield 1 may be readily attached to or detached from the radiator. However, if it is desired, the shield 1 may be permanently secured to the radiator 2 by any suitable means.

A blow-torch burner 15, which extends upwardly through an opening in the bottom 16 of the shield 1, is located near one side of the latter and is connected to a pipe 17, the valve of same being operated in the usual manner by means of a hand-wheel 18 or the like. Between this same side of the shield 1 and the burner 15, the pipe 17 extends upwardly through the bottom 16 and then extends substantially horizontally over the upper end of the burner 15 toward the other side of the shield, where said pipe extends downwardly through the bottom of the shield and then leads either to the carbureter pipe-line (not shown) or to a separate pressure tank (not shown) containing gasolene or other hydrocarbon. The arrangement of the burner 15 is such that the flame from same will strike the horizontal portion of the pipe 17, so as to heat that portion of the latter near the burner sufficiently to assist the gasolene or other hydrocarbon to vaporize. An opening 19 in the shield 1 permits the insertion of a lighted match or the like for lighting the burner 15, and may be kept closed, when not in use, by means of a shutter 20 pivoted or otherwise attached to the shield 1.

In order to distribute the heat uniformly throughout the space 3, a plate 21, which extends from one side of the shield to the other side thereof directly over the horizontal portion of the pipe 17, is arranged to slope upwardly from the side of the shield, near which the burner 15 is located, and is riveted or otherwise secured to the shield 1, the burner 15 being, also, slightly inclined so as to direct the flame more toward the high end of the plate 21. The plate 21 is provided with a plurality of perforations 22, a larger number of which is located nearer the high end of the plate 21 than near the low end, because of the burner 15 being arranged so that the flame strikes the under side of the plate nearer the low end than the high end of the latter. By this arrangement, the heated air which passes through the perforations 22 in plate 21 is distributed uniformly throughout the space above said plate. An apron 23 depending from the rear side of the plate 21 retains the flame underneath the plate 1 and helps to cause the greater amount of the heated air to pass upwardly through the perforations 21.

It will be evident that the air which is heated by the blow-torch 15 and is distributed uniformly throughout the space 3 in the manner hereinabove described will pass into the ventilating opening of the radiator and around the tubes of the latter, thereby heating same and preventing the water in same from freezing. This heating of the radiator will cause the water to circulate through the cooling system, thereby not only preventing the water in the pipes and water-jackets from freezing but also keeping the engine warm enough to facilitate the starting of same. Some of the heat will pass through the ventilating opening of the radiator into the interior of the hood and will help to keep the engine warm. In order to prevent any gas that might escape from the carbureter or elsewhere and accumulate within the hood from coming in contact with the flame and exploding, the open back of the shield 1 is covered with a screen 24, which may be either permanently secured to the shield by rivets 25 or other suitable means, or may be detachably secured to the shield.

This heater is intended to be burned in cold weather when the machine is standing idle, and when the machine is running the burner is extinguished. In order to permit the usual circulation of air through the ventilating opening of the radiator, when the car is running, the shield is provided with a relatively large opening 26 having a door 27, the rear side of which is preferably covered with a lining 27ᵃ of asbestos or like material. This door 27 bears a finger 28 or a plurality of such fingers and the shield 1 contains a slot 29 or a plurality of such slots to receive the finger or fingers 28, so that the door can be removed to allow the air to circulate through the ventilating opening of the radiator when the car is running. When the heater is ignited, the door is set in place in its closed position and is held or locked in such position by a bolt or latch 30 or other suitable means.

Some machines require less ventilation than others, and instead of a relatively large opening 26 being formed in the shield 1, as hereinabove described, the latter may be provided with a plurality of relatively small openings 31, as depicted in Fig. 6, and, if desired, each opening 31 may be provided with a movable shutter 32 for opening and closing same. Furthermore, if desired, for the purpose of ventilation the shield 1 may be provided with a louvered opening 33 as illustrated in Figs. 8, 9, 10, in which case each slat 34 is preferably pivotally attached at 35 at the ends thereof to lugs 36 borne by the shield 1, as best seen in Fig. 9. Each slat 34 also has a lining 37 of asbestos or the like, and each end of the former is provided with an arm 38, the arms 38 of each slat adjacent to one side of the opening 33 being pivotally connected at 39 to a rod or bar 40, and the arms 38 adjacent to the other side of the opening 33 being similarly connected to another rod or bar 40, so that when one slat is rocked on its pivots 35, the other slats will be rocked simultaneously therewith, whereby the slats 34 may be set either in position to close the opening 33, as depicted in Fig. 8, while the heater is burning, or the slats may be set in position to permit the air to pass through the opening 33, as shown in Fig. 10, in order to allow the air to circulate through the ventilating opening of the radiator while the car is running. As a means for moving the slats 34, a handle 41 is preferably fastened to the lower slat, and in order to hold the slats in position to permit the air to pass through the opening 33 and then circulate through the ventilating opening of the radiator the lower slat is provided with an arm 42 having a notch 43 therein, which notch is adapted to hook over the lower edge of the opening 33, as shown in Fig. 10, when the slats are turned to open the opening 33. If desired, the shield 1 may be provided with an extension 44, as shown in Figs. 8 and 11, to protect the burner 15.

Numerous changes in the construction and arrangement of the ventilating means, various substitutions and changes in the arrangement of the heat-generating means, and minor changes in the construction and arrangement of the parts may be made without departing from the nature and spirit of this invention.

I claim:

1. A heating device for motor vehicle radiators including a cover, means supported by the cover for supplying heat to the cover interior, and heat distributing means connected to the cover and overlying said heat supplying means.

2. A heating device for motor vehicle radiators including a cover, means supported by the cover for supplying heat to the cover interior, and a perforated heat distributing plate extending from side to side of the cover and connected thereto in overlying relation to said heat supplying means.

3. A heating device for motor vehicle radiators including a cover, means supported by the cover for supplying heat to the cover interior, and a perforated heat distributing plate extending from side to side of the cover and connected thereto in overlying relation to said heat supplying means, said plate sloping upwardly from the heat supplying means and having a greater number of said perforations at its high end than at its low end.

4. A heating device for motor vehicle radiators including a cover, means supported by the cover for supplying heat to the cover interior, a heat distributing plate extending from side to side of the cover and connected thereto in overlying relation to the heat supplying means, an apron extending downwardly from the rear side of the plate, and a screen connected to the cover to prevent gas passing through the radiator from the carbureter or other parts of the engine from contacting with the heat supplying means.

5. A heating device for motor vehicle radiators including a cover, means supported by the cover for supplying heat to the cover interior, a heat distributing plate extending from side to side of the cover and connected thereto in overlying relation to the heat supplying means, and an apron extending downwardly from the rear side of the plate.

6. A heating device for motor vehicle radiators including a cover, means supported by the cover for supplying heat to the cover interior, heat distributing means connected to the cover and overlying said heat supplying means, and a screen connected to the cover to prevent gas passing through the radiator from the carbureter or other parts of the engine from contacting with the heat supplying means.

In testimony whereof I hereunto affix my signature in the presence of two witnesses.

W. L. MAJORS.

Witnesses:
GEORGE G. ANDERSON,
WALTER C. GUELS.